United States Patent [19]

Meyer-Berg et al.

[11] Patent Number: 5,346,260
[45] Date of Patent: Sep. 13, 1994

[54] DEVICE FOR CONNECTING A FUEL NOZZLE TO A FILLING HOSE

[75] Inventors: Heinz-Ulrich Meyer-Berg, Plettenberg; Gerhard Jaeger, Herscheid; Karlheinz Ehlers, HamburgHochkamp, all of Fed. Rep. of Germany

[73] Assignee: Albert Hiby GmbH & Co. KG, Plettenberg, Fed. Rep. of Germany

[21] Appl. No.: 12,282

[22] Filed: Feb. 1, 1993

[30] Foreign Application Priority Data

Feb. 1, 1992 [DE] Fed. Rep. of Germany ....... 4202956

[51] Int. Cl.⁵ .............................................. F16L 35/00
[52] U.S. Cl. ...................................... 285/1; 285/351; 285/906
[58] Field of Search .................... 285/1, 304, 906, 351; 137/614.04

[56] References Cited

U.S. PATENT DOCUMENTS

| | | | |
|---|---|---|---|
| 2,413,106 | 12/1946 | Kelle | 285/304 |
| 2,452,430 | 10/1948 | Clark et al. | 285/1 |
| 2,701,147 | 2/1955 | Summerville | 285/1 |
| 4,800,913 | 1/1989 | Nitzberg et al. | 285/1 X |
| 5,018,546 | 5/1991 | Carmack | 285/1 X |

*Primary Examiner*—Arolai Dave W.
*Attorney, Agent, or Firm*—Herbert Dubno; Yuri Kateshov

[57] ABSTRACT

A male and female coupling member of a device allowing separation of a fuel nozzle from a filling hose, to prevent the entrainment of the nozzle by the vehicle from rupturing the hose or damaging the fuel pump having a detent which is wedged out of engagement by a torque applied to the male member within the female member against the force of a restoring spring because of play between the male and female coupling members.

14 Claims, 4 Drawing Sheets

DEVICE FOR CONNECTING A FUEL NOZZLE TO A FILLING HOSE

FIELD OF THE INVENTION

The present invention relates to a device for coupling a fuel nozzle to a filling hose of a filling column or station. More particularly this invention concerns to a device enabling separation of the filling hose from a filling nozzle which may have been left in the filling passage of a motor vehicle when the motor vehicle pulls away from the fuel pump without removal of the nozzle.

BACKGROUND OF THE INVENTION

It is known to provide a device for connecting a fuel nozzle to a filling hose at a filling pump at a refueling station or column and which will enable the separation of the hose from the nozzle without damage of the hose, destruction of the fuel pump or like destructive event, upon a vehicle pulling away from the fuel pump with the nozzle inadvertently left in place.

Prior to the development of such a device, especially where the refueling is unattended, it was not uncommon for the nozzle to be left in the fuel tank passage of the vehicle and for the drive to fail to recognize that fact.

Accordingly, the vehicle could leave the refueling station with the nozzle still in the vehicle filling opening, thereby exerting a force to the hose which could cause the hose to rupture or could even destroy the fuel pump apparatus, create a danger of fire or explosion, or otherwise damage property or injure personnel.

To avoid these problems, a device was developed which could allow the coupling between the nozzle and the fuel hose to pull apart under the circumstances described.

In that device, a female coupling member was connected to the nozzle and a male coupling member was connected to the hose and could fit into the female coupling member. A detent ring within the female coupling member engaged in a recess or groove of the male connecting member and could be cammed out of that groove upon the development of a tension on the coupling device which corresponded to the tension signifying the entrainment of the nozzle with the vehicle.

Generally with automatic nozzles, in the fully seated state of the male coupling member in the female coupling member, a shoulder on the male coupling member abutted an end face of the female member.

The detent ring could be a so-called Seeger ring, i.e. a split ring, which expanded upon being cammed outwardly.

Usually, but not necessarily, the device also included a pivot joint with a pivot axis which remained more or less horizontal during refilling and was transverse to the flow direction. This joint was usually integrated into the female coupling member and enabled a swinging of the nozzle relative to the male coupling member and thus facilitated manipulation of the nozzle.

With filling pumps of the type designed to evacuate vapor, as is increasingly required by law or regulation, the filling hose has as outer hose for the fuel supply and an inner hose for gas evacuation. In female coupling members of this type, a plug coupling is provided for the connection of the inner hose which can pull apart when the detent ring is released from its groove.

In these earlier systems, the detent can effectively release when tension is applied substantially axially between the hose and the nozzle.

In cases, however, when the nozzle is inadvertently left in the fuel tank of a vehicle which pulls away from the filling pump an inclined tension force is generated which applies a torque at the coupling. This torque, in some cases, can cause the male coupling member to jam within the female coupling member and thus prevent the detent from releasing. Should the vehicle travel further, the hose can tear or the fuel pump can be destroyed. The integration of a pivot in the female coupling member does not prevent this damage when axis of the torqued is not parallel to the pivot axis and/or the torque is applied in such manner that the degrees of freedom of the pivot cannot accommodate it.

OBJECTS OF THE INVENTION

It is the principal object of the present invention, therefore, to provide an improved coupling device for the purposes described which provides greater reliability of separation of the nozzle from the filling hose should a vehicle inadvertently leave the refilling station with the nozzle in its filling opening.

A more specific object of the invention is to provide a coupling of not coupling of the nozzle with the hose but which is effective to permit separation when a torque is applied which might, in earlier systems, jam the device against release of the detent.

Still another object of the invention is to provide a release device which is effective both in the case of axial separation forces and of axial or torque generating forces which hitherto may have resulted in jamming of the detent.

SUMMARY OF THE INVENTION

These objects and others which will become more readily apparent hereinafter are attained, in accordance with the invention by providing between the female coupling member and the male coupling member in the region of the end of the male coupling member turn toward the nozzle, an angular play and a restorign spring. The restoring spring in the absence of a torque between the coupling members is effective to position the two members so that they are coaxial and can have a restoring force which can be overcome by the torque and is such that the detent ring is levered out of the detent groove and the male coupling member is levered out of the female coupling member when the spring has its restoring force overcome by the torque.

The function of the restoring spring is that of an adjusting or positioning spring which fixes the relative positions of the members in the absence of the torque.

It will be understood that the device can have the usual sealing rings in the form of soft sealing rings between the female coupling member and the male coupling member.

The restoring spring can be of different types and configurations as long as it fulfills the described function. It can be constituted of a number of springs or spring parts.

In a preferred embodiment of the invention, the restoring spring is an annular spring surrounding the male coupling member. In this case it can be easily fabricated and mounted. Advantageously, the restoring spring has a U-shape in a radial section, a section in an axial plane, which is closed in the direction facing the nozzle.

The restoring spring can be so arranged and constructed that it simultaneously has a sealing function. It can be constituted of a sufficiently stiff elastic material, e.g. a plastic or synthetic resin.

When conventional soft sealing rings are used as seals, a respective ring can be provided in a groove in each of the male and female coupling members and can be engageable with the spring ring, preferably from opposite sides.

In an embodiment of the invention, the restoring spring can be formed unitarily with the female coupling member in the region at which the male coupling member is inserted.

More advantageously, a device according to the invention for connecting a refueling nozzle with a filling comprising:

a female coupling member affixed to a refueling nozzle;

a male coupling member affixed to a filling hose and receivable in the female coupling member;

a detent ring on one of the members engageable in a recess formed in the other of the coupling members upon insertion of the male coupling member in the female coupling member for retaining the coupling members in a coupled state until the device is subjected to a tension force resulting from departure of a refueling vehicle with the nozzle in its refueling port from a refueling station provided with the nozzle and the hose and thereupon disengaging to release the nozzle from the hose, the male coupling member being received in the female coupling member with a limited angular play permitting angular disalignment of the members;

a restoring spring braced between the coupling members and coaxially aligning the male coupling member in the female coupling member upon discontinuance of a disaligning torque effecting angular disalignment of the members; and means for levering the detent ring out of the recess and the male coupling member out of the female coupling member.

The device of the invention has the advantage that it allows a separation and release of the detent even in cases in which a torque is applied between the members as a nozzle is entrained with a vehicle inadvertently leaving the gas pump. The standard nozzle can be connected to the hose simply and quickly according to the invention and the parts of the female coupling member can remain largely unchanged especially as far as the connection to the nozzle is concerned. The plug type coupling for an inner hose can remain unaltered as well.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
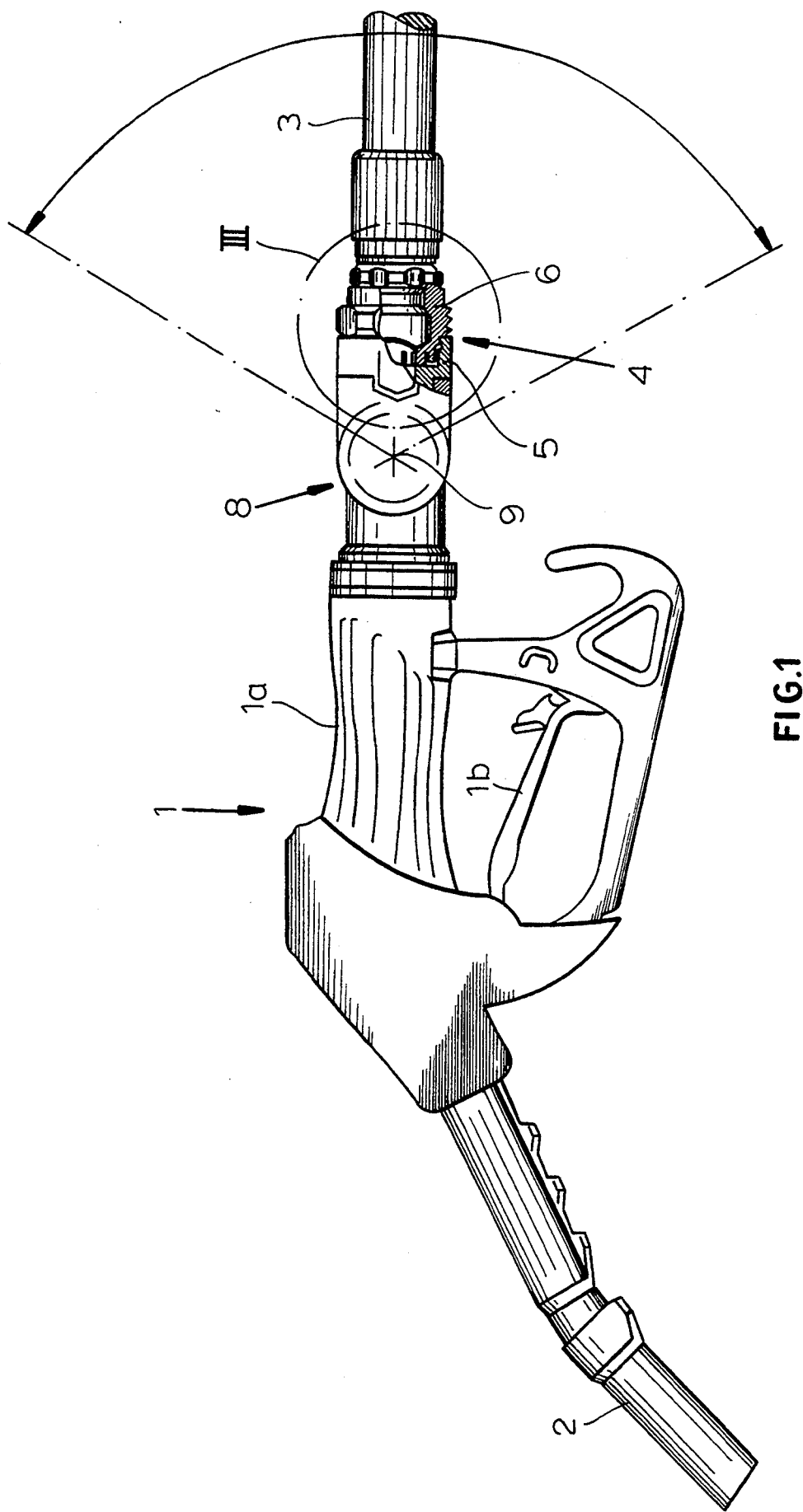
FIG. 1 is a side elevational view, partly broken away of a vehicle refueling nozzle and hose according to the invention.
Figure 2:
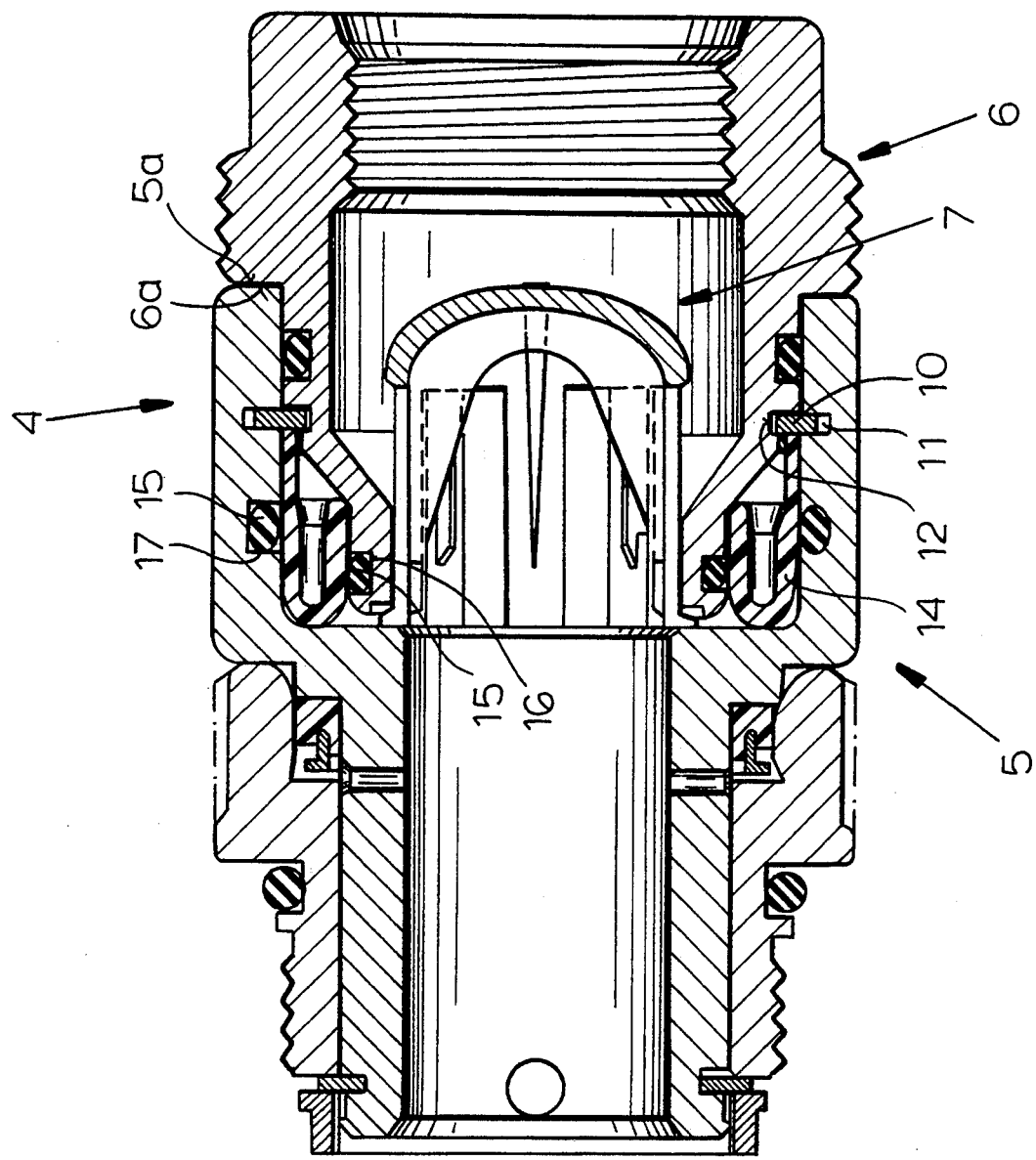
FIG. 2 is a view of the device of the invention drawn to a larger scale than that of FIG. 1 and shown in the coupled state.

The nozzle shown in FIG. 1 is connected by a hose 3 to a dispensing pump, usually on a column at a service station or filling station along side of which the motor vehicle positions itself for refilling.

The spigot 2 of the nozzle 1 is inserted into the filling opening of the vehicle fuel tank after the cover thereof has been removed.

The spigot 2 is connected to a handle 1a which is provided with a lever 1b for opening the valve of the nozzle to admit the fuel to the vehicle fuel tank.

Between the hose 3 and the nozzle 1 a device 4 is provided for coupling the nozzle 1 and the hose 3.

The device 4 comprises, on the nozzle side, a female coupling member 5 and on the hose side, a male coupling member 6 which can be held together by a detent arrangement represented generally at 7. These parts form a unitarily functioning assembly. This assembly can include, additionally, a pivot 8 whose freedom of pivotal movement is represented by the arcuate arrow in FIG. 1 and comprises a pivot axis 9 which is perpendicular to the plane of the drawing in FIG. 1. Naturally, not withstanding this degree of freedom of pivotal movement the pivot 8 cannot follow a torque whose torque axis lies in the plane of the drawing in FIG. 1 and which may apply between the nozzle and the hose should the vehicle tend to drive away while the nozzle is in the filling opening of the vehicle.

Figure 3:
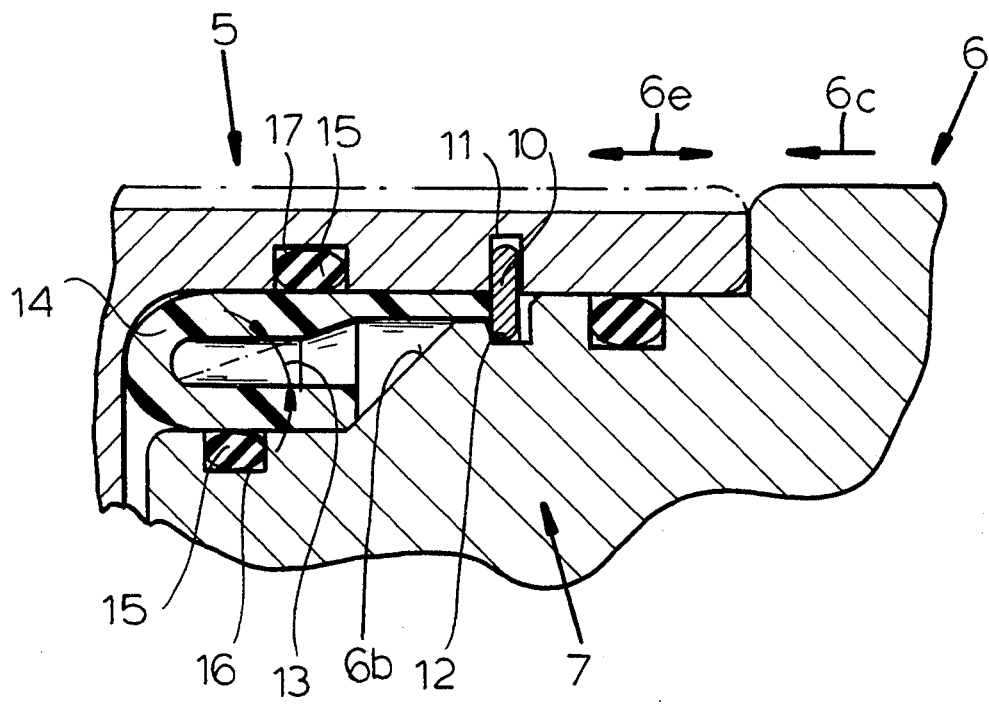
FIG. 3 is a detail of a portion of the region III shown in FIG. 1.

The detent device 7 comprises a detent ring 10 which is received in a groove 11 of the female coupling member 5 and snaps into a detent groove 12 of the male coupling member, being cammed outwardly by a frustoconical flank 6b when the male coupling member is inserted into the female coupling member in the direction of arrow 6c (FIG. 3).

The groove 12 has an inclined flank 6d which can cam the split ring 10 outwardly when the male coupling member and the female coupling member are pulled apart (arrow 6e) by a tension sufficient to separate the parts should the vehicle pull away from the hose in the axial direction.

However, to allow the device to pull apart also when a torque is applied between the coupling members (FIGS. 4 and 5) which would jam earlier coupling devices, between the female coupling member 5 and the male coupling member 6 at the end of the male coupling member 6 turned toward the nozzle, an angular play 13 (FIG. 3) is provided which is resisted by a restoring spring 14.

The restoring spring 14 which can be composed of a synthetic resin or elastomer material, biases the members 5 and 6 into axial alignment in the absence of the aforementioned torque. In the presence of that torque, however, the restoring spring 14 is bent (see FIGS. 4 and 5) and permits the member 6 to lever the ring 10 out of the recess 12 and, of course, the member 6 to be levered out of member 5.

Figure 4:
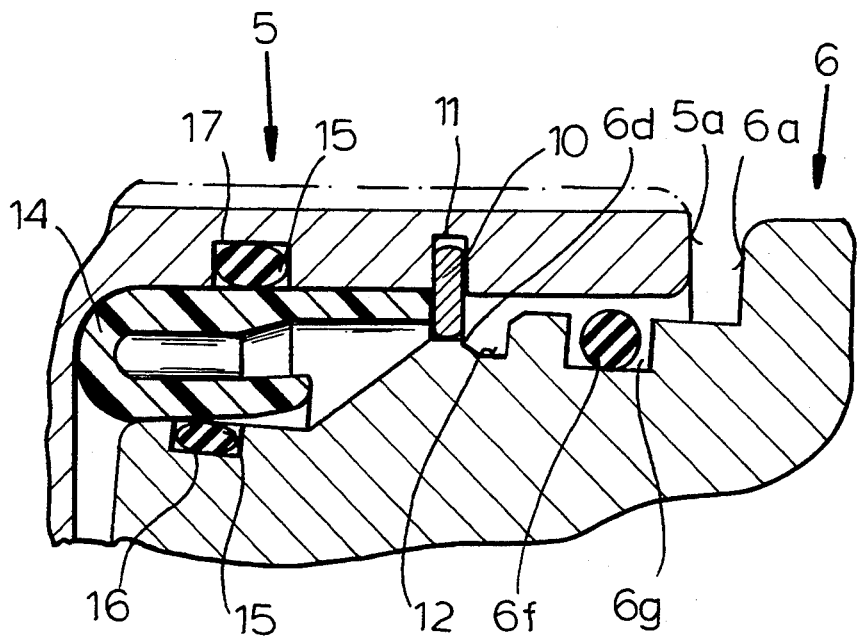
FIG. 4 is an illustration of the assembly of FIG. 3 in another position.
Figure 5:
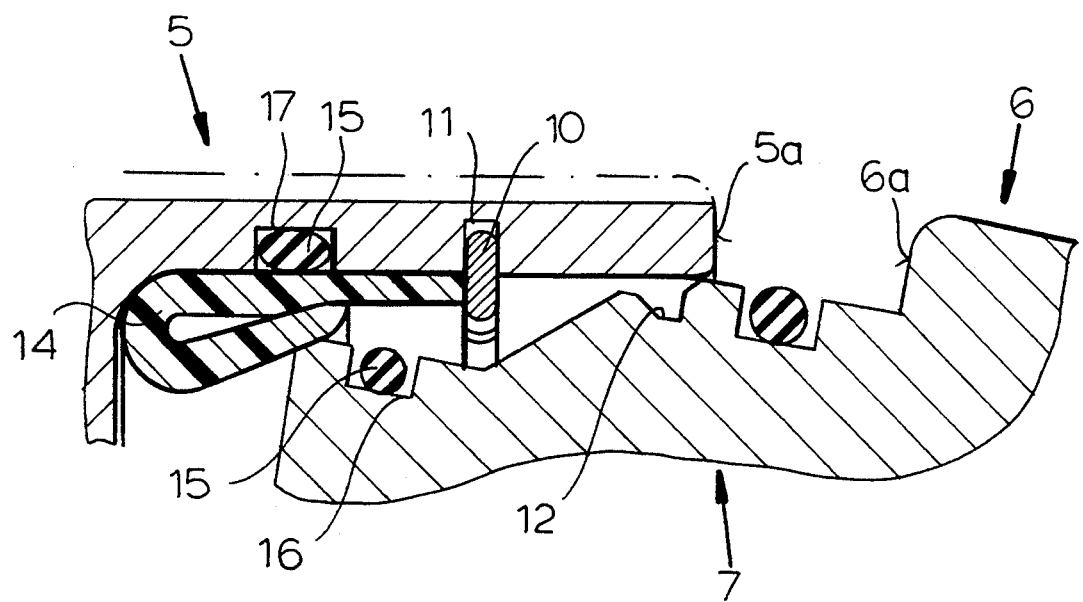
FIG. 5 is another view of this assembly in still another position.

Initially, upon application of the torque, in this lever ring action, the shoulder 6a of the male coupling member 6 will bear against the end 5a of the female coupling member at the side of the device diametrically opposite that shown in FIGS. 4 and 5 to form a fulcrum for the levering action. As a result, there is no danger of rupture of the hose 3 nor any danger that the fuel pump will be destroyed even if the vehicle pulls on the nozzle in the direction exerting a torque on the coupling device.

As can be seen from the drawing also, soft sealing rings 15 are provided in grooves 16 and 17 in the male coupling member and the female coupling member and engage the restoring spring 14 from opposite sides.

A further, O-ring seal can be provided at 6f in a groove 6g of the male coupling member.

In the embodiment shown in FIGS. 1-5 and in a preferred embodiment, the restoring spring 14 is an annular spring surrounding the male coupling member and is of U-section, closed at its side turned toward the nozzle.

The restoring spring 14 is composed of synthetic resin or elastomer.

Figure 6:
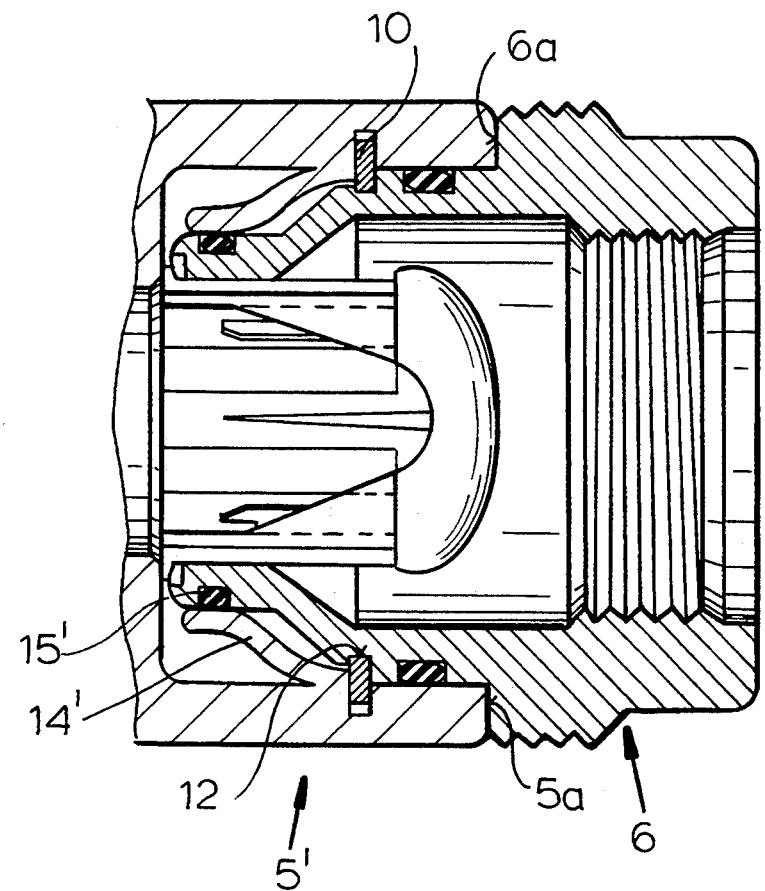
FIG. 6 is a detail view in cross section of a portion of the device for coupling a hose to a nozzle according to another embodiment of the invention.

In the embodiment of FIG. 6, however, the coupling member 5' is formed unitarily with a restoring spring 14' in the receptacle for the male coupling member 6. The seal 15' of the male coupling member here engages the restoring spring.

From comparison of FIGS. 3-5, the effect of the torque can be seen, the ring 10 being initially levered out of the groove 12 (FIG. 4) and the member 6 being then levered out of the female coupling member 5 (FIG. 5).

Either or both of the coupling members can be provided with a valve (not shown) which can block the escape of fuel therefrom.

We claim:

1. A device for connecting a refueling nozzle with a filling hose, comprising:
   a female coupling member affixed to a refueling nozzle;
   a male coupling member affixed to a filling hose and receivable in said female coupling member;
   a detent ring mounted fixedly on one of said members and engageable in a recess formed in the other of said coupling members upon insertion of said male coupling member in said female coupling member for retaining said coupling members in a coupled state until said device is subjected to a tension force resulting from departure of a refueling vehicle with said nozzle in its refueling port from a refueling station provided with said nozzle and said hose;
   decoupling means in said recess for disengaging said members to release said nozzle from said hose upon applying of the tension force to said device;
   means including a space for providing a limited angular play between said male and female coupling members after said male member is received in said female coupling member, said space permitting angular disalignment of said members in said coupling state upon applying a disaligning torque effecting angular disalignment of said members;
   a restoring spring in said space braced between said coupling members and coaxially aligning said male coupling member in said female coupling member upon discontinuance of said disaligning torque; and
   levering means on said members cooperating with said disengaging means for levering said detent ring out of said recess and said male coupling member out of said female coupling member upon said disaligning torque becomes sufficient to overcome a restoring force of said spring.

2. The device defined in claim 1 wherein said restoring spring is an annular spring.

3. The device defined in claim 2 wherein said restoring spring has in axial section a U shape closed toward said nozzle.

4. The device defined in claim 3 wherein said restoring spring is composed of a plastic.

5. The device defined in claim 4, further comprising two sealing rings, one of said sealing rings being received in a groove formed in said female coupling member, the other of said sealing rings being received in a groove formed in said male coupling members, both of said sealing rings bearing resiliently upon said restoring spring.

6. The device defined in claim 1 wherein said levering means on said members effective upon application of a torque between said coupling members sufficient to overcome a restoring force of said spring includes an annular shoulder on said female coupling member seated against an annular shoulder of said male coupling member upon alignment of said members in the absence of torque between said members.

7. The device defined in claim 1 wherein said restoring spring is a resilient formation formed unitarily on said female coupling member.

8. The device defined in claim 7 wherein said restoring spring is an annular spring.

9. The device defined in claim 8 wherein said levering means on said members effective upon application of a torque between said coupling members sufficient to overcome a restoring force of said spring includes an annular shoulder on said female coupling member seated against an annular shoulder of said male coupling member upon alignment of said members in the absence of torque between said members.

10. The device defined in claim 1 wherein said restoring spring has in axial section a U shape closed toward said nozzle.

11. The device defined in claim 1 wherein said restoring spring is composed of a plastic.

12. The device defined in claim 1, further comprising at least one sealing ring received in a groove formed in said male coupling member and bearing resiliently upon said restoring spring.

13. The device defined in claim 1 wherein said levering means on said members effective upon application of a torque between said coupling members sufficient to overcome a restoring force of said spring includes an annular shoulder on said female coupling member seated against an annular shoulder of said male coupling member upon alignment of said members in the absence of torque between said members.

14. The device defined in claim 1 wherein said disengaging means includes an inclined flank camming said ring outwardly upon applying said tension force in an axial direction sufficient to separate said members.

* * * * *